US012771663B2

(12) United States Patent
Slobodyanuk et al.

(10) Patent No.: US 12,771,663 B2
(45) Date of Patent: Oct. 20, 2026

(54) SYSTEM AND METHOD FOR CLUSTERING EMAILS IDENTIFIED AS SPAM USING MACHINE LEARNING CLASSIFIER

(71) Applicant: AO Kaspersky Lab, Moscow (RU)

(72) Inventors: Yury G. Slobodyanuk, Moscow (RU); Roman A. Dedenok, Moscow (RU); Dmitry S. Golubev, Moscow (RU); Nikita D. Benkovich, Moscow (RU); Alan S. Savushkin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 1239 days.

(21) Appl. No.: 17/552,445

(22) Filed: Dec. 16, 2021

(65) Prior Publication Data

US 2022/0294751 A1 Sep. 15, 2022

(30) Foreign Application Priority Data

Mar. 15, 2021 (RU) .......................... RU2021106647

(51) Int. Cl.

| | |
|---|---|
| ***H04L 9/40*** | (2022.01) |
| ***G06F 18/2321*** | (2023.01) |
| ***G06N 3/04*** | (2023.01) |
| ***H04L 51/212*** | (2022.01) |

(52) U.S. Cl.

CPC ........ *H04L 51/212* (2022.05); *G06F 18/2321* (2023.01); *G06N 3/04* (2013.01); *H04L 63/00* (2013.01)

(58) Field of Classification Search

None

See application file for complete search history.

(56) References Cited

U.S. PATENT DOCUMENTS 7,797,443 B1 * 9/2010 Pettigrew ............ G06Q 10/107 713/153
8,131,655 B1 * 3/2012 Cosoi .................... G06N 3/045 706/12
8,170,966 B1 * 5/2012 Musat .................. H04L 51/212 706/14
8,825,769 B2 * 9/2014 Zheleva .................. G06N 7/01 726/1
10,762,200 B1 * 9/2020 Salem .................. G06F 21/566
2012/0016877 A1 * 1/2012 Vadrevu ................. G06F 16/35 707/E17.089
2021/0021553 A1 1/2021 Benkovich et al.

OTHER PUBLICATIONS

Jia et al. "Orthogonal Deep Neural Network" arXiv (Year: 2019).*

* cited by examiner

*Primary Examiner* — Amresh Singh
(74) *Attorney, Agent, or Firm* — ArentFox Schiff LLP; Michael Fainberg

(57) ABSTRACT

Disclosed herein are systems and methods for clustering email messages identified as spam using a trained classifier. In one aspect, an exemplary method comprises, selecting at least two characteristics from each received email message, for each received email message, using a classifier containing a neural network, determining whether or not the email message is a spam based on the at least two characteristics of the email message, for each email message determined as being a spam email, calculating a feature vector, the feature vector being calculated at a final hidden layer of the neural network, and generating one or more clusters of the email messages identified as spam based on similarities of the feature vectors calculated at the final hidden layer of the neural network.

20 Claims, 6 Drawing Sheets

400

SYSTEM AND METHOD FOR CLUSTERING EMAILS IDENTIFIED AS SPAM USING MACHINE LEARNING CLASSIFIER

CROSS REFERENCE TO RELATED APPLICATIONS

The present application claims priority to Russian Patent Application No. 2021106647, filed on Mar. 15, 2021, the entire content of which is incorporated herein by reference.

FIELD OF TECHNOLOGY

The present disclosure relates to the field of information security tools, e.g., by detecting similar email messages using a classifier.

BACKGROUND

"Spam" is a term used for bulk mailings of advertising—related information or other types of messages without the consent of the recipients. Those who send such messages receive lists of spam addresses by all available means, such as stolen databases, open sources, or simply by random selection. At present, there are many different technical means used for sending spam. For example, spam may be sent using proxy servers, free mail servers that allow automation of email message distribution, and/or infected computer systems belonging to users, from which bot networks are formed.

Emails containing spam are a major problem in the modern world, as the volume of spam is already reaching 70-90% of total email traffic. This volume of spam sent over computer networks is a cause of great inconvenience for email users. In particular, spam causes reduced network bandwidth, wasted resources in messaging systems, and increased email processing time, both for users and computers. In addition, the volume of spam reduces the performance of servers (both mail and backbone servers, which transmit the traffic) and leads to financial losses (the so-called "bandwidth" of the channel is paid for based on its size). Therefore, it is necessary to constantly combat spam.

There exist different approaches to detecting spam: signature-based, heuristic, and those that use machine learning methods.

The signature-based approach uses spam traps. An email caught in such a trap is automatically deemed to be spam. The email is divided into constituent parts. Then, signatures are formed from subsets of the constituent parts. The signatures allow items caught in the spam traps to be detected on computer systems of users and large mail servers. The advantage of this approach is that there is almost zero probability of a type one error, whereby a legitimate email is identified as spam. In heuristic analysis there are no heuristic signatures as such, but there is a set of rules for detecting spam. The disadvantage of the heuristic and signature approaches to detecting spam is their insufficient generalizing power. Consequently, these approaches allow some spam emails to get through, in other words, there is significant chance for the occurrence of a type two error.

In another approach, a human analyst may be used to improve the heuristic and signature approaches. The automation without correction by an analyst often produces insufficiently general detection signatures and rules. The human contribution to protection against spam in signature-based and heuristic analysis generally improves the results. However, these approaches have a time lag. For example, between the event of an email being caught in the trap and a new signature being issued a period of a few minutes to a few days might elapse, and hence there is a problem of missing spam emails from "fresh" spam mailings.

In other approaches, machine learning methods may be used to reduce the time lag. The machine learning methods use a collection of spam emails against a collection of non-spam emails. The emails are dealt with in parts, from which the parts that are found in both collections are excluded. The remaining parts are used to train the classifier. However, these classifier allows emails other than spams to also be detected as spam. The advantage of this approach is the high generalization capacity, which reduces the number of spam emails that are missed. However, the downside of this approach is the high probability of false positives.

Therefore, there is a need for a method and a system for improving information security, e.g., by detecting similar email messages.

SUMMARY

Aspects of the disclosure relate to information security, more specifically, to systems and methods of clustering email messages identified as spam. For example, the method of the present disclosure is designed to use a cloud service to select characteristics of email messages, classify the emails into spam or non-spam, and generate clusters from the email messages classified as spam while reducing both type one and type two errors.

In one exemplary aspect, a method is provided for clustering email messages identified as spam, the method comprising: selecting at least two characteristics from each received email message, for each received email message, using a classifier containing a neural network, determining whether or not the email message is a spam based on the at least two characteristics of the email message, for each email message determined as being a spam email, calculating a feature vector, the feature vector being calculated at a final hidden layer of the neural network, and generating one or more clusters of the email messages identified as spam based on similarities of the feature vectors calculated at the final hidden layer of the neural network.

In one aspect, a characteristic of the email message comprises at least one of: a value of a header of the email message, and a sequence of parts of the header of the email message.

In one aspect, the classifier is trained such that orthogonality of matrices of the neural network is preserved.

In one aspect, the orthogonality of the matrices of the neural network is preserved using a modified batch-normalization layer.

In one aspect, the orthogonality of the matrices of the neural network is preserved using a dropout layer.

In one aspect, the orthogonality of the matrices of the neural network is preserved by multiplying a dense layer by a hyper-parameter.

In one aspect, the orthogonality of the matrices of the neural network is preserved by using a hyperbolic tangent as an activation function.

In one aspect, the orthogonality of the matrices of the neural network is preserved by having the loss function implement a constant dispersion of neurons of the neural network.

According to one aspect of the disclosure, a system is provided for clustering email messages identified as spam, the system comprising a hardware processor configured to: select at least two characteristics from each received email message, for each received email message, using a classifier containing a neural network, determine whether or not the email message is a spam based on the at least two characteristics of the email message, for each email message determined as being a spam email, calculate a feature vector, the feature vector being calculated at a final hidden layer of the neural network, and generate one or more clusters of the email messages identified as spam based on similarities of the feature vectors calculated at the final hidden layer of the neural network.

In one exemplary aspect, a non-transitory computer-readable medium is provided storing a set of instructions thereon for clustering email messages identified as spam, wherein the set of instructions comprises instructions for: selecting at least two characteristics from each received email message, for each received email message, using a classifier containing a neural network, determining whether or not the email message is a spam based on the at least two characteristics of the email message, for each email message determined as being a spam email, calculating a feature vector, the feature vector being calculated at a final hidden layer of the neural network, and generating one or more clusters of the email messages identified as spam based on similarities of the feature vectors calculated at the final hidden layer of the neural network.

The method and system of the present disclosure are designed to provide information security, in a more optimal and effective manner, enabling legitimate emails to reach their destination while detecting spam emails. Thus, in one aspect, the technical result of the present disclosure includes detecting spam emails while reducing type one and type two errors.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
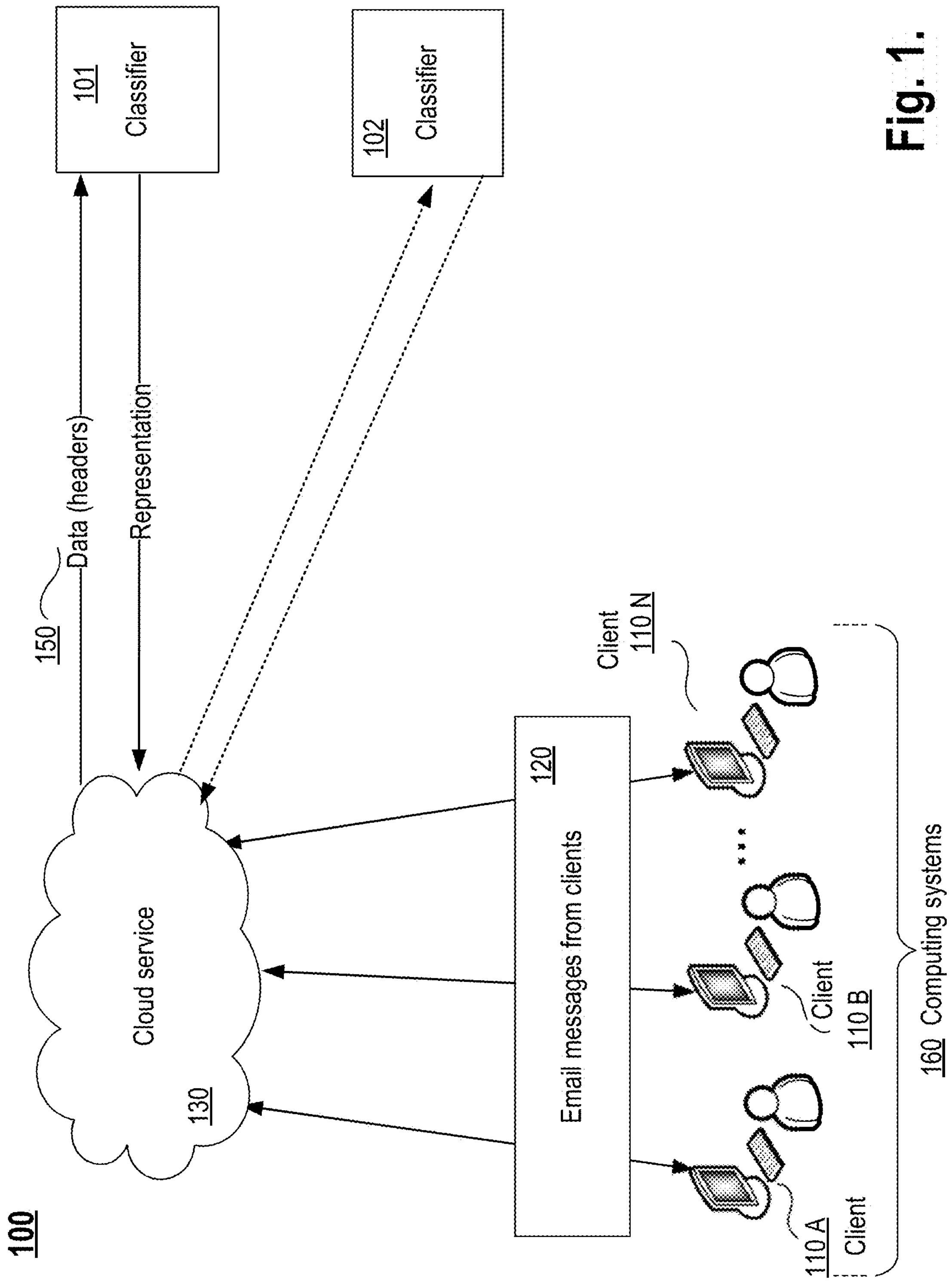
FIG. 1 illustrates a block diagram of an exemplary system for recognizing an email as spam in accordance with aspects of the present disclosure.

Exemplary aspects are described herein in the context of a system, method, and a computer program for clustering email messages identified as spam in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

An email message (also referred to as electronic mail) has a particular structure. Therefore, special programs that support the structure of an email are used to create the email. In addition to the body, an email contains headers (or fields)—this is service information, including information about the route taken by the emails. The headers provide information about when and where the email came from and by which route, as well as information added to the email by various utility programs. Each header is identified by its name and value. The value of the header includes information represented in a pre-defined format. For example, for a header that contains information about the sender of the message, the name is preceded by "from", and the value will have the form of the email address of the sender, for example, username@domain.com.

Some of the headings will now be discussed in more detail, such as "Message_ID" and "X-mailer".

"Message_ID" refers to a unique identifier of the message, which is most commonly assigned to each message by the first mail server that handles the message along its path. It usually has the form "name@domain", where "name" can be anything (for example, "a1B0!#"), often a meaningless set of characters, and "domain" is the name of the machine (for example, "domen.ru") that assigned the identifier. Sometimes, but rarely, "name" includes the sender's name. If the structure of the identifier is violated (empty string, no @ sign), the second part of the identifier is not a real internet site or the structure, even if correct, is nonetheless not typical for the vast majority of mail services, then the email is probably a fake (in order to pass spam off as a regular email).

"X-mailer" or "mailer_name" refers to a free text field in which the mail program or service that generated the email identifies itself, for example, "Outlook 2.2 Windows". The value of this header, combined with other headers, may indicate that the emails are spam.

As mentioned above, headers are added to the email as it proceeds along the route from sender to receiver. Header sequences (parts of the headers), as well as the values of some individual headers, can be used to categorize emails as spam.

The following are examples of data in the format "Header sequence; X-mailer header value; Message_ID header value" for spam and non-spam emails.

Spam

1. "content-type: date:from: subject:tomessage-id:"; "none"; "<i3mbd6v4vhjsdcmi-zu60opfkwplxb44x-37-6f8d@homesolrrebtes.icu>"
2. "content-type: date:from: subject:to:message-id:"; "none"; "<h5bds3kpswnk0ds0-oalwbjt3 dtlcvhlv-2e-19550@homesolrrebtes.icu>"
3. "content-type:date:from:subject:to:message-id:"; "none"; "<yo8j0xsjsdrvxywv-ie41tpc7x1e0b3 no-26-c36d@homesolrrebtes.icu>"
4. "content-type:date:from:subject:to:message-id:"; "none"; "<7enbb9h6c2vapnhr-na5nlwg42raodhr7-2e-4febe@homesolrrebtes.icu>"

5. "message-id:from:to:subject:date:content-type:x-mailer:"; "Microsoft Outlook Express 6.00.2900.2316"; "<D2DDF9E326F6C73C33170DC81829D2DD@8II5L3SPI>"
6. "message-id:from:to:subject:date:content-type:x-mailer:"; "Microsoft Outlook Express 6.00.2900.2180"; "<D98EBBF7F3ECC2BFE8DD91958AA4D98E@L0773DI>"
7. "message-id:from:to:subject:date:content-type:x-mailer:"; "Microsoft Outlook Express 6.00.2900.2180"; "<F90CED31F818D024D130EC25C50DF90C@7TMANVQ>"
8. "message-id:from:to:subject:date:content-type:x-mailer:"; "Microsoft Outlook Express 6.00.2900.5512"; "<311476D62A53B48AAFCD6D91E80F3114@VX18OHGV>".

Non-Spam

1. "content-type:date:from:subject:to:message-id:"; "none"; "<3c8b3b43089c02b53b882aa9ae67f010@acmomail-3.emirates.net.ae>"
2. "content-type:date:from:subject:to:message-id:"; "none"; "<3c8b3b43089c02b53b882aa9ae67f010@acmomail-3.emirates.net.ae>"
3. "content-type:date:from:subject:to:message-id:"; "none"; "<3c8b3b43089c02b53b882aa9ae67f010@acmomail-3.emirates.net.ae>"
4. "content-type:date:from:subject:to:message-id:"; "none"; "<3c8b3b43089c02b53b882aa9ae67f010@acmomail-3.emirates.net.ae>"
5. "from:to:subject:date:message-id:content-type:x-mailer:"; "Microsoft Office Outlook 12.0"; "<006b01d51986$06411be0$12c353a0$@domroese@evlka.de>"
6. "from:to:subject:date:message-id:content-type:x-mailer:"; "Microsoft Outlook 15.0"; "<!&!AAAAAAAAAAAYAAAAAAAAAEuD2rCF-vsdIgBF3v59c6PrCgAAAEAAA AD+/2KYKE3pHiC1PnnSDdSk"
7. "from:to:subject:date:message-id:content-type:x-mailer:"; "Microsoft Outlook 15.0"; "<!&!AAAAAAAAAAAYAAAAAAAAAEuD2rCF-vsdIgBF3v59c6PrCgAAAEAAA AJCLHZRUOfl-DoROPaFfOwCk".

Looking at the examples of characteristics taken from emails classified into different categories, it becomes clear that a human being would take a long time to extract features from similar data that allow spam to be identified, or may make a mistakes in identifying the features. In order to address these shortcomings, the present disclosure uses machine learning techniques. In particular, through the use of deep learning techniques, the method of the present disclosure allows dependencies that are not visible to human observers to be detected.

FIG. 1 illustrates a block diagram of an exemplary system 100 for recognizing an email as spam in accordance with aspects of the present disclosure. The system 100 is implemented for a plurality of computer systems 160. Thus, the system 100 comprises the plurality of computer systems 160, a classifier 101, a cloud service 130, as well as the emails 120.

The cloud service 130 collects and stores data about the emails 120 received from customers of the clients 110 A, 110 B, . . . , 110 N. Clients 110 A, 110 B, . . . , 110 N refer to at least the mail clients of the users installed on each computer system of the set of computer systems 160, which includes both the user computing devices and email servers. In one aspect, the cloud service 130 comprises a system that interacts with an information security network, for example, with the Kaspersky Security Network (abbr. KSN) supplied by Kaspersky Laboratory.

Figure 5:
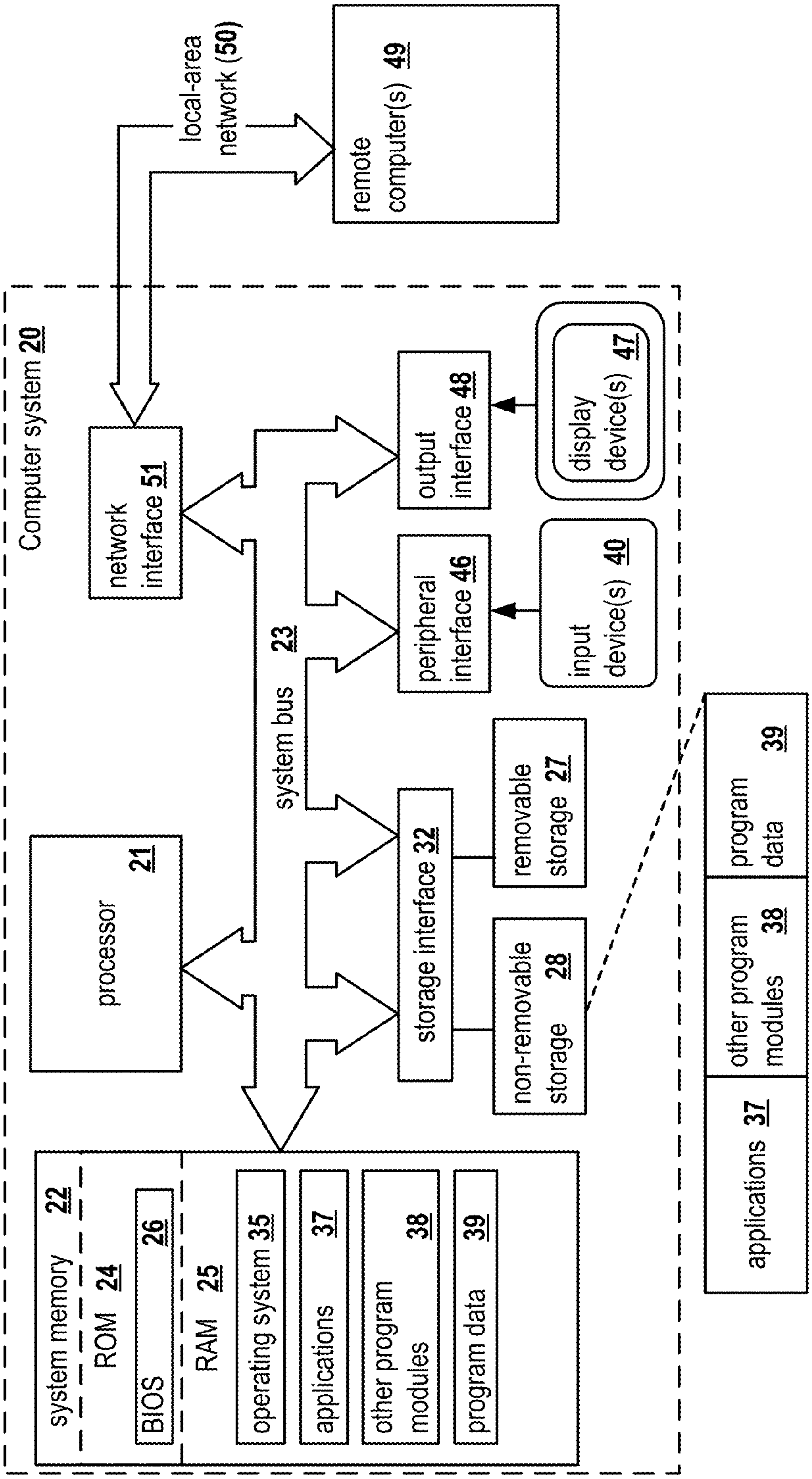
FIG. 5 presents an example of a general purpose computer system on which aspects of the present disclosure can be implemented.

In one aspect, the cloud service 130 may be implemented using the computer system illustrated in FIG. 5. It is worth noting that the information collected by the cloud service 130 does not contain information relating to the user or information that uniquely identifies the user. To this end, some of the information collected by the cloud service 130 is anonymized. This information collected by the cloud service 130 comprises data from the body of the email, such as data from the text messages of users, and from headers of the emails, such as the email addresses.

The term "anonymization" refers to conversion of information, for example, using convolution techniques implemented using at least one of: hash functions, asymmetric encryption techniques, and so on. In one aspect, the system 100 complies with General Data Protection Regulation (GDPR) requirements.

Figure 2:
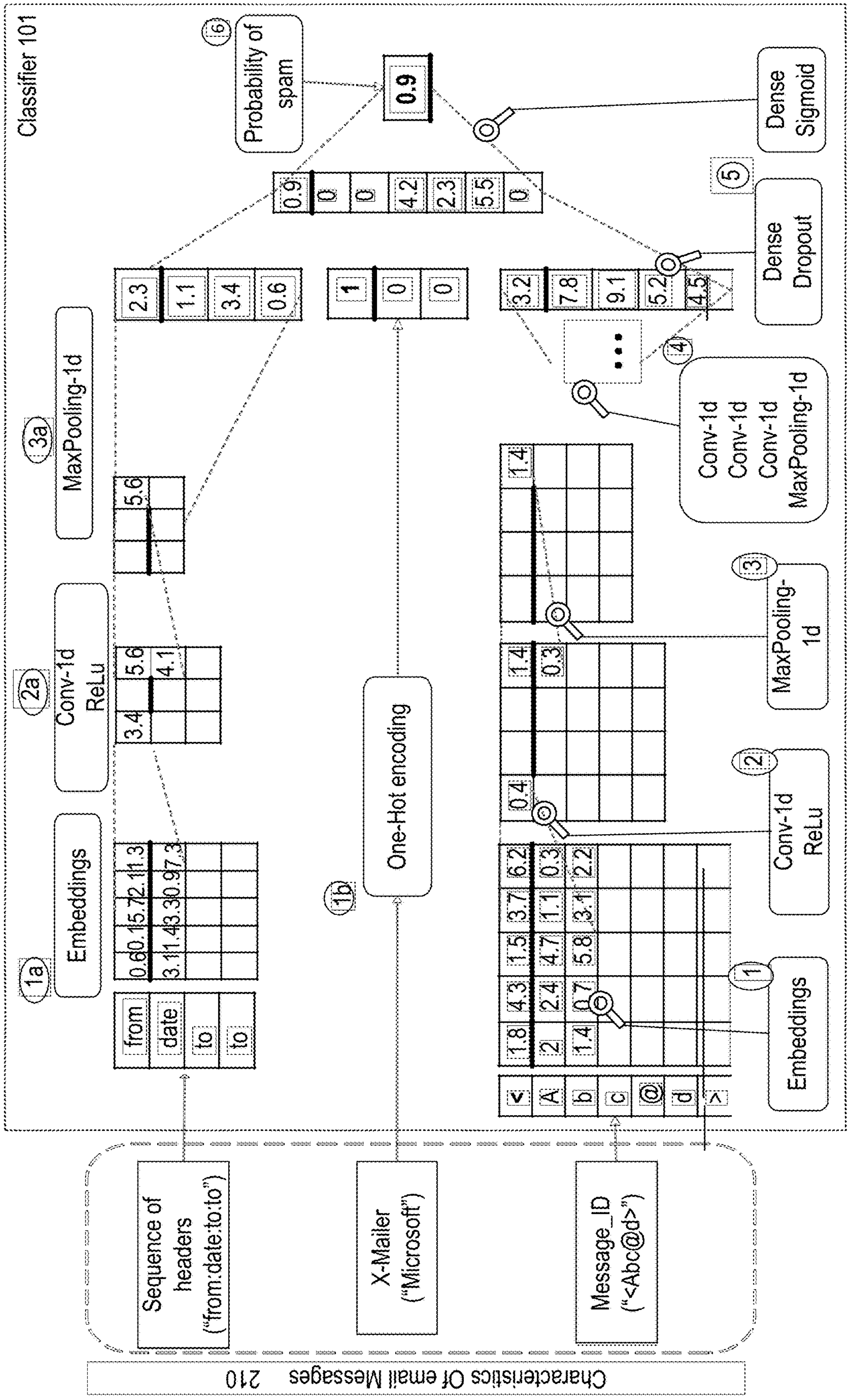
FIG. 2 illustrates an example of an analysis for characterizing emails using a classifier in accordance with aspects of the present disclosure.

In one aspect, for each email from the clients 110 A, 110 B, . . . , 110 N, the cloud service 130 collects and stores values of at least one of: the "Message ID" and "X-mailer" headers in their original form (not converted), the sequence of at least some of the other and/or remaining headers, and the category of the email ("spam", "not spam") output by the classifier 101 (see FIG. 2). In one aspect, the cloud service 130 passes the data 150 (stored data) to the classifier 101. In one aspect, the classifier 101 receives and processes the data from the cloud service 130 using a classifier trained using machine learning techniques to decide whether or not the email is spam.

FIG. 1 further comprises the classifier 102, which is a modified version of classifier 101 which is redesigned for email clustering in accordance with the teachings of the present disclosure. The classifier 102 is described below in conjunction with the description of FIG. 3.

FIG. 2 illustrates an example of an analysis for characterizing emails using a classifier in accordance with aspects of the present disclosure. In Russian patent application number RU 2019 122433 and U.S. patent application Ser. No. 16/673,049 a solution based on classification of emails without analysis of their content (non-content) is described.

In one aspect, core functions of the method of the present disclosure are performed using the spam classifier 101, which is based on deep learning methods. The machine learning model used in the classifier 101 is a result obtained by training a machine learning algorithm using data. Once the training is completed, when input data is entered into the model, the model returns output data. For example, the spam detection algorithm creates a spam detection model. Then, when data is entered into the spam detection model, it produces a spam detection result based on the data which was used to train the model.

The input of the model receives characteristics 210 of an email message, e.g., email 120. The characteristics 210 comprise one or more of: values of the headers Message_ID, X-mailer, and a sequence of other headers of the email. Each of these values passes through several stages of feature detection that affect the final decision of the classifier 101. The stages of the feature detection are indicated as 1-4 in FIG. 2.

An example implementation of the conversion for each of the characteristics will now be described below.

Message_ID

In step (1), each symbol of the Message_ID header value is identified by a sequence of numbers of fixed length (for example, 90 characters), forming a matrix of dimensions 80×90.

In step (2), the resulting matrix is fed to the input of a one-dimensional convolution layer (Cony-1d, from 1D convolution), and 64 filters of size 5 (ReLu, from the term Rectified Linear Unit) are created, which are applied step by step to the sub-sequences of Message_ID to detect regularities from them. It is worth noting that wider filters can be used to obtain features from longer sub-sequences. The size of the resulting matrix is 76×64.

In step (3), a one-dimensional MaxPooling-1d layer is used. Step (3) is used in order to avoid cases where small changes in Message_ID, such as character displacement, fundamentally changing the resulting matrix (i.e. to avoid generating a chaotic system). Max-pooling, when the filter matrix in the already known convolution layer is fixed and unitary. That is, multiplying by it does not affect the input data in any way. Then, instead of summing up all the results of multiplying the input data according to the given condition, the maximum element is simply selected. That is, the element with the highest intensity from the entire window is selected. In addition, instead of the maximum of the functions, another arithmetic or even more complex function may be used. The one-dimensional MaxPooling-1d layer takes the maximum of the values in the given window (slice of the layer). In the example of FIG. 2, a window of size 5 is used with an increment of 3 (the window is shifted by 3 elements each time). The size of the resulting matrix is 26×64.

In step (4), several one-dimensional convolution layers are applied sequentially, each with 64 filters of size 3, after which one-dimensional MaxPooling is applied with a window size of 3 and an increment of 3.

The resulting matrix of size 6×64 is unfolded into a vector of fixed length (in the current example, a fixed length of 445). That is, the two-dimensional matrix is convolved into a one-dimensional vector in such a way that all the dependencies identified in the matrix are preserved.

Sequence of Headers

This is processed in the same way as Message ID, except for the number of layers and input data.

In step (1*a*), instead of the characters, as was the case for Message ID, the header names are convolved into a sequence of numbers. At the same time, the convolution can be carried out by any method known in the relevant art, for example, each word may be assigned a number from a previously generated dictionary, the entire header or its individual lexemes may be convolved with the aid of a hash function, each letter of the header may be assigned to its number from the previously generated dictionary, and so on.

In step (2*a*), the resulting 10×20 matrix is input to the one-dimensional convolutional layer.

In step (3*a*), the result of step (21) is fed to a MaxPooling layer. The resulting matrix has a size of 2×16 and is unfolded into a vector of fixed length (in the current example, a fixed length of 32).

X-Mailer

Since the value of the X-Mailer header is a categorical characteristic of an email message, the vectorial representation of this data in step (1*b*) uses an approach known as unitary encoding (or 'one-hot encoding'—a binary code of fixed length, containing only one 1 (direct unitary code) or only one 0 (inverse unitary code)). Thus, for a length N there are 2N possible code variants, which corresponds to 2N different states or characteristics of the header. The length of the code is determined by the number of objects to be encoded, that is, each object corresponds to a separate bit of the code, and the value of the code to position 1 or 0 in the encoded word. The resulting vector has a size of 29 and consists of zeros and one unit that indicates the category X-Mailer.

Then, in step (5), the extracted features for each characteristic are combined and undergo several further stages of transformation in order to allow for interrelationships between the input values. In the example described above, a dense dropout procedure is initially applied. The dense dropout procedure is a method used for regularizing artificial neural networks intended for preventing overtraining of the network. The method essentially consists of selecting a layer during the training of the network, from which a specific amount of neurons (for example, 30%) is randomly excluded and which then take no further part in the calculations. Then, after the exclusion, an activation function (known as a dense sigmoid) is used which outputs a number between 0 and 1.

In step (6), the output of the classifier 101 is interpreted as a probability of the email being a spam, or as a degree of similarity of the characteristics of the email 120 to characteristics of spam emails.

Then, in one aspect, the classifier 101 compares the numerical indicator at the output with a predefined threshold value set for accepting or rejecting the decision. That is, the comparison to the predefined threshold is used to determine whether or not to recognize the email 120 as spam.

Figure 3:
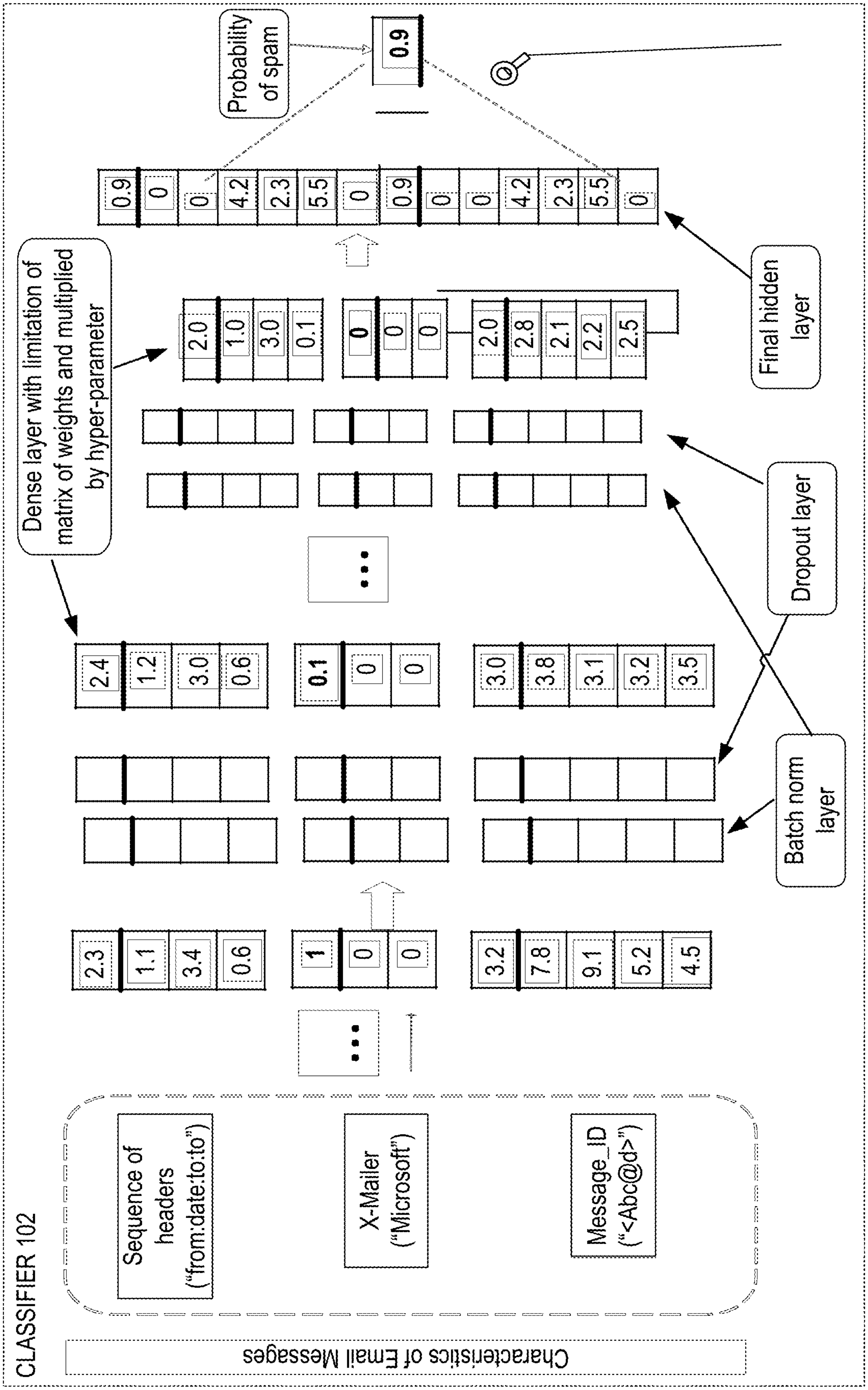
FIG. 3 illustrates an example of a trained spam classifier for detecting similar emails in accordance with aspects of the present disclosure.

FIG. 3 illustrates an example of a trained spam classifier for detecting similar emails in accordance with aspects of the present disclosure. The method described herein advantageously allows similar email messages to be detected by using the trained spam classifier 101 discussed in the description of FIG. 2.

It is worth noting that, in one aspect, all classifiers 101 based on neural networks are trained as follows: the input of the classifier 101 receives data, and weights of the layers of the neural network are adjusted to minimize losses due to incorrect decisions, wherein the adjustments of the weights are based on observed data. The losses of the classifier 101 (described in conjunction with FIG. 2) allow a rapid distinction to be made between "spam"/"not spam", while taking into account the structure of the data (technical headers of emails).

In order to solve the problem of detecting similar email messages using the trained spam classifier 101, several transformations are performed. As a result of these transformations, the neural network of the classifier 102 (obtained from the classifier 101) allows a solution to the problem of determining the similarity of emails and, as before, allows an object to be classified as "spam"/"not spam".

In solving the problem of determining the similarity of the emails 120, several types of information loss within the classifier 101 were identified. The first type of information loss, leading to reduced accuracy, increased uncertainty in the calculations and consequently errors, is the correlation between the data within the neural network.

In one aspect, there is a hidden representation of the objects (a vector), in which the features of the objects are correlated. Correlation of the features of the objects (e.g., features of the emails 120) causes the neural network to consider the same piece of information multiple times. This occurs because the neural network described in the description of FIG. 2 gradually converges (towards the resulting vector), so that it is not necessary to store all information about the email 120, rather it is only necessary to compute whether the email 120 is spam or not. It is therefore necessary to ensure that the neural networks are not correlated. For this purpose, in the classifier 102 all the matrices mentioned in the description of FIG. 2 are initialized orthogonally. Orthogonality is a necessary property to guard against correlation. A second type of information loss is correlation of the data used for training the classifier 102. Therefore, after ensuring orthogonality for the initialization of the matrices, it is essential to preserve orthogonality for the training of the classifier 102. Preserving the orthogonality of the training requires the loss function to be changed, which involves adding additional conditions that penalize the neural network so that it preserves orthogonality in order to reduce the correlation between the neural networks.

Thus, after the convolution operation, when the characteristics of the email 120 are combined into a single input vector in the classifier 102, the classifier 102 is additionally transformed as follows.

For each hidden dense layer in the classifier 102:

1) A modified batch-normalization layer is added, which is necessary to obtain a zero mathematical expectation and identical dispersion of the vector component (layer). In one of the embodiments, this layer is calculated from:

$$\hat{\phi}(h_{l,i}) = \gamma_l \frac{\phi(h_{l,i}) - \mu_{\phi(h_{l,i})}}{\sqrt{\sigma^2_{\phi(h_{l,i})} + \epsilon}},$$

where:

$\hat{\phi}(h_{l,i})$ is the matrix describing the hidden layer 1;

$\mu_{\phi(h_{l,i})}$ is the mathematical expectation of the batch;

$\gamma_{l,i}$ is the gamma parameter of the compression of the normalized magnitude;

$$\sigma^2_{\phi(h_{l,i})}$$

is the dispersion of the batch; and $\epsilon$ is a constant for the computational stability; and where:

The mathematical expectation of the batch must be equal to zero.

The beta parameter is excluded from the calculations, since once it is trained, if present the mathematical expectation will not be equal to zero.

Gamma parameters for each layer are selected to be identical so that the dispersion will also be identical.

2) An exclusion layer or dropout is added to reduce the correlation between neurons. As a result of a practical experiment it was established that the activation function is non-linear and may generate additional correlation in the neural network. Most effective from the point of view of performance (the time required to compute the decision) is a dropout which ensures equally probable exclusion of a certain percentage (for example, 20%) of random neurons (located both in the hidden and in the visible layers) on different iterations during training of the neural network.

3) The fully connected layer (Dense on the diagram of the architecture) is modified with a limitation on the orthogonality of the weights of the matrix. This is essential to prevent any correlations from occurring after the transformation. The size of the layer must not exceed the dimensionality of the input vector. The orthogonality of the matrix may be achieved in a number of ways, for example, the rotation matrix is defined by Euler's angles. These angles can be restricted to a specific range, that is, it is possible to place a limit on the elements of the matrix, for example, on the size of the numbers.

4) The dense layer is multiplied by the hyper-parameter (a parameter which is set before the training, for example, the size of the vector, or something else that describes the basis from the model), that satisfies the norm of the transformation matrix vectors (this step is necessary to provide additional regularization to prevent overtraining).

5) An activation function is used (in general, a hyperbolic tangent). It is worth noting that the activation function in neural networks can introduce additional correlation, because it performs a convolution of the data with a particular loss of information.

Using the method of random projection—a method for reducing the dimensionality of the set of points located in a Euclidean space—it is possible to obtain an estimate of the reduction in the size of the representation vector (the final hidden layer of the classifier 102). The method random projection allows a set of points of an N-dimensional space to be mapped onto a set of points of an (N-M)-dimensional space. For example, for the final hidden layer of the classifier 102 it sets the minimum width of the layer (the number of neurons) according to:

$$\frac{\ln(M)}{0.9^2},$$

where M is the size (number of emails) of the training sample, but not exceeding the size of the preceding layer.

For example, for a sample consisting of 140 million emails, the width of the final hidden layer is equal to:

$$\frac{\log(140 * 10^6)}{0.9^2} \approx 26.$$

To detect the similarity when applying the classifier 102 a reverse pass—gradient—is not used. As a result, for the vectorization of the data the gradient is not calculated, instead the final hidden layer of the network is used. Thus, as a result of practical experiments, gradient descent, for example, allows a dimensionality of the vector of the order of 50 thousand elements to be obtained. The vector obtained as a result of the steps described above has a dimensionality of ~25 elements, which increases the speed of calculations performed by the classifier 102 significantly (by several orders of magnitude).

To train the classifier 102 the following loss function is used, calculated from the previously obtained loss function (this process is iterative):

$$\tilde{L}(\Theta) = L(\Theta) + \frac{1}{2}\sum_{l=1}^{L} \lambda_l \cdot \left\|W_l^T W_l - I\right\|_F^2,$$

where:

$L(\Theta)$ is the loss function—the magnitude of the hypothesis error over the events $\Theta$, $W_l$ is the matrix of weights, $$W_l^T$$

is the transpose of the matrix $W_l$, and

I is the identity matrix.

The reduced loss function allows orthogonal matrices of weights to be obtained in each dense layer after convolution in the classifier 102 after using a dropout and the batch-normalization layer approach, wherein constant dispersion is observed for all the features (neurons). During the training of the classifier 102 the neural network is penalized, which means the weights are modified such that the trained model performs a clustering of the data into similar clusters with higher probability than for the current clusters. A matrix multiplied by the transpose of the matrix is equal to the identity matrix—which is the condition of orthogonality. The classifier 102 uses the matrix of weights, transposes it, multiplies it by the matrix of weights and obtains the identity matrix as a result. After this, it calculates the norm. If the property of orthogonality is fully implemented, the resulting matrix is zero and the classifier 102 adds nothing to the losses. If the resulting matrix is not equal to the identity matrix, the property of orthogonality is not implemented, the norm is non-zero, and so the norm is added to the penalty. The penalty function is then applied, so that the output calculated by the network will correspond to an actual object. The task of training the neural network is to reduce the penalties, in other words, to reduce to a minimum both the number of changes in the weights and their relative values. For example, it is to select the weights of the neural network such that the penalties are minimal, while minimizing the losses. In the general case, at the start of the training the weights are random and the losses are significant. The network performs the first iteration, and as a result of the training it reduces the losses. It then repeats the training steps to minimize the loss.

Figure 3A:
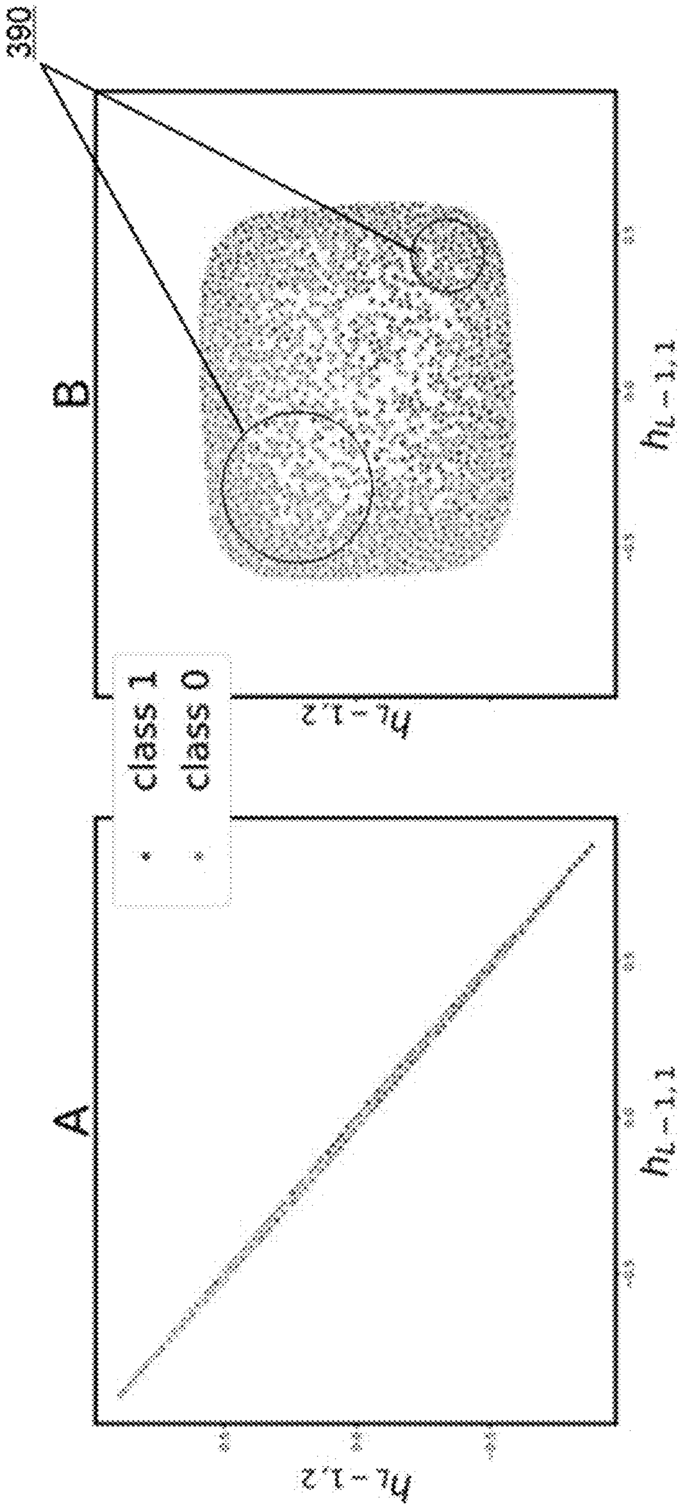
FIG. 3*a* illustrates an example of a clustering of spam emails using features that a trained spam classifier stores on a last hidden layer in accordance with aspects of the present disclosure.

FIG. 3*a* illustrates an example of a clustering of spam emails using features that a trained spam classifier stores on a last hidden layer in accordance with aspects of the present disclosure. For example, the features may be stored on the final hidden layer by the classifier 101 (set "A") and the classifier 102 (set "B"). In this case class 0 is non-spam, class 1 is spam. It is apparent that if set "B" is used it is possible to isolate clusters 390 for clustering the email messages 120. Set "A" corresponds almost completely to a linear probability estimate (the features are linearly dependent) and is not suitable for clustering.

Thus, after the email message 120 is received, the cloud service 130 extracts the headers from it and passes the extracted headers to the classifier 102 (see FIG. 1). The trained classifier 102 is used by the cloud service 130 to compare the email messages 120 by calculating the distances between the email messages 120, wherein the cloud service 130 uses the final hidden layer of the classifier 102 to calculate the distances. In addition, at the final layer, the classifier 102 calculates the decision as to whether the email 120 is spam or not, as before. The feature vector that was obtained at the final hidden layer of the network is used by the cloud service 130 to generate clusters of the emails 120. In one aspect, the comparison of the emails 120 is performed using a cosine distance. If the cosine distance is below a predetermined threshold value, the emails 120 are deemed to be similar. The cloud service 130 generates clusters from the similar emails.

Examples of the use of the classifier 102 for detecting similar emails 120 and the process of generating the clusters of emails 120 are described below.

In one aspect, the cloud service 130 compares the feature vector (for example, using the cosine distance, or some other method in the relevant art) with known spam, and detects the similarity, and forms clusters of the emails 120 based on the similarity of the emails 120.

In one aspect, the generation of clusters of emails 120 allows bot-nets to be detected. For example, the cloud service 130 identifies the IP addresses of servers from which similar emails 120 were sent. In addition, in the case of repeated sending of similar emails 120 the list of addresses of bot-nets may be extended or corrected.

In another aspect, the cloud service 130 compares the feature vector of an email 120 with feature vectors of other emails 120 that have been quarantined (proactive anti-spam protection). If the emails are similar, the cloud service 130 takes a decision, based on the quantity of similar emails, for example.

In yet another aspect, the cloud service 130 checks whether there are groups of emails 120 which are not fully identified as spam (some of the emails in the group were identified as spam, but others were not). For example, there is a cluster of similar emails 120, detected using the classifier 102, but two thirds are identified by the cloud service 130 as spam and one third are not. If similar clusters of emails 120 are found, it will be necessary to perform an audit of the rules for spam detection by the cloud service 130.

In yet another aspect, the cloud service 130 checks whether there are similar distributions of emails 120 detected by the classifier 102 as a single cluster but described by more than one rule. If there are, it will be necessary to check for the possibility of describing similar mailings by a single, but more general, rule for performing the detection.

Figure 4:
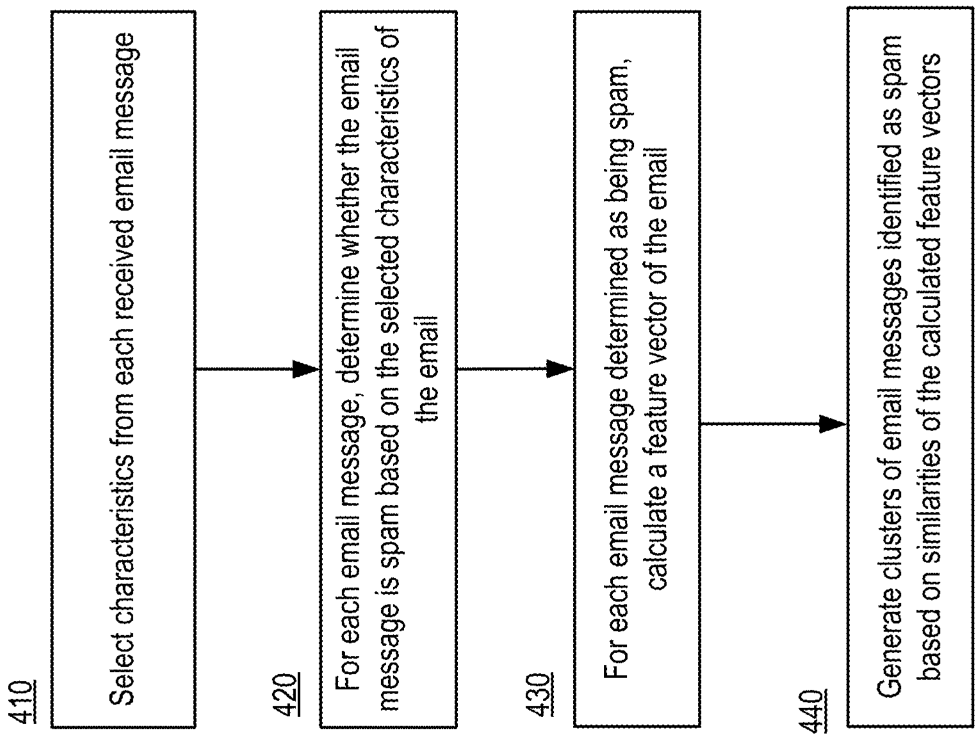
FIG. 4 illustrates a method for clustering email messages identified as spam using a trained classifier in accordance with aspects of the present disclosure.

FIG. 4 illustrates a method 400 for clustering email messages identified as spam using a trained classifier in accordance with aspects of the present disclosure. In one aspect, the method for clustering emails is implemented with the aid of the cloud service 130.

In step 410, method 400, selects at least two characteristics from each received email message 120.

In one aspect, a characteristic of the email message 120 comprises at least one of:

a value of a header of the email message 120, and a sequence of parts of the header of the email message 120.

The characteristics of the email messages 120 were described in conjunction with the description of FIG. 2.

In step 420, for each received email message 120, using a classifier 102 containing a neural network, method 400 determines whether or not the email message is a spam based on the at least two characteristics of the email message 120.

In one aspect, the classifier 102 is trained such that orthogonality of matrices of the neural network is preserved.

In one aspect, the orthogonality of the matrices of the neural network is preserved using a modified batch-normalization layer.

In one aspect, the orthogonality of the matrices of the neural network is preserved using a dropout layer.

In one aspect, the orthogonality of the matrices of the neural network is preserved by multiplying a dense layer by a hyper-parameter.

In one aspect, the orthogonality of the matrices of the neural network is preserved by using a hyperbolic tangent as an activation function.

In one aspect, the orthogonality of the matrices of the neural network is preserved by having the loss function implement a constant dispersion of neurons of the neural network.

The various approaches for preservation of orthogonality were described in more detail in conjunction with the description of FIG. 3.

In step 430, for each email message 120 determined as being a spam email, method 400 calculates a feature vector, the feature vector being calculated at a final hidden layer of the neural network of the classifier 102.

In step 440, method 400 generates one or more clusters of the email messages 120 identified as spam based on similarities of the feature vectors calculated at the final hidden layer of the neural network of the classifier 102.

FIG. 5 is a block diagram illustrating a computer system 20 on which aspects of systems and methods for clustering emails identified as spam may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for clustering email messages identified as spam using a trained classifier, the method comprising:

selecting at least two characteristics from each received email message;

for each received email message, using a classifier containing a neural network, determining whether or not the email message is a spam based on the at least two characteristics of the email message, wherein the classifier is trained such that orthogonality of matrices of the neural network is preserved using a dropout layer that reduces correlation between neurons and preserves the orthogonality by ensuring equally probable exclusion of a certain percentage of random neurons including both hidden and visible layers on different iterations during training;

for each email message determined as being a spam email, calculating a feature vector, the feature vector being calculated at a final hidden layer of the neural network without calculating a gradient during application of the classifier, wherein a width of the final hidden layer is restricted to reduce a dimensionality of the feature vector; and generating one or more clusters of the email messages identified as spam based on similarities of the feature vectors calculated at the final hidden layer of the neural network, wherein a cluster is generated when a cosine distance between two or more feature vectors is below a predetermined threshold value.

2. The method of claim 1, wherein a characteristic of the email message comprises at least one of: a value of a header of the email message, and a sequence of parts of the header of the email message.

3. The method of claim 1, wherein the orthogonality of the matrices of the neural network is further preserved using a modified batch-normalization layer, and wherein the modified batch-normalization layer preserves the orthogonality through a configuration such that:

a mathematical expectation of a batch is set to zero, gamma parameters for each layer of the neural network are selected to be identical so that a dispersion of vector components is identical, and a beta parameter is excluded from calculations to maintain a zero mathematical expectation.

4. The method of claim 1, wherein the orthogonality of the matrices of the neural network is further preserved by multiplying a dense layer by a hyper-parameter, wherein the hyper-parameter satisfies a norm of transformation matrix vectors and provides additional regularization to prevent overtraining and to maintain the orthogonality of the matrices of the neural network.

5. The method of claim 1, wherein the orthogonality of the matrices of the neural network is further preserved by using a hyperbolic tangent as an activation function, wherein the hyperbolic tangent preserves the orthogonality by performing a non-linear transformation of data and minimizing additional correlation introduced by activation.

6. The method of claim 1, wherein the orthogonality of the matrices of the neural network is further preserved by having a loss function implement a constant dispersion of neurons of the neural network, wherein the loss function includes a penalty term that enforces the constant dispersion of the neurons in the neural network by penalizing deviations from orthogonality in weight matrices.

7. The method of claim 1, further comprising:

in response to determining that classifying all email messages within a cluster of the one or more clusters as spam requires application of multiple detection rules from a plurality of detection rules, consolidating the multiple detection rules into a single rule for performing spam detection; and detecting spam in one or more new email messages using the single rule.

8. The method of claim 1, further comprising:

identifying one or more IP addresses of servers from which the email messages of the generated cluster were sent to detect a bot-net; and updating a list of addresses of bot-nets based on the identified one or more IP addresses.

9. A system for clustering email messages identified as spam using a trained classifier, comprising:

at least one processor configured to:

select at least two characteristics from each received email message;

for each received email message, using a classifier containing a neural network, determine whether or not the email message is a spam based on the at least two characteristics of the email message, wherein the classifier is trained such that orthogonality of matrices of the neural network is preserved using a dropout layer that reduces correlation between neurons and preserves the orthogonality by ensuring equally probable exclusion of a certain percentage of random neurons including both hidden and visible layers on different iterations during training;

for each email message determined as being a spam email, calculate a feature vector, the feature vector being calculated at a final hidden layer of the neural network without calculating a gradient during application of the classifier, wherein a width of the final hidden layer is restricted to reduce a dimensionality of the feature vector; and generate one or more clusters of the email messages identified as spam based on similarities of the feature vectors calculated at the final hidden layer of the neural network, wherein a cluster is generated when a cosine distance between two or more feature vectors is below a predetermined threshold value.

10. The system of claim 9, wherein a characteristic of the email message comprises at least one of: a value of a header of the email message, and a sequence of parts of the header of the email message.

11. The system of claim 9, wherein the orthogonality of the matrices of the neural network is further preserved using a modified batch-normalization layer, and wherein the modified batch-normalization layer preserves the orthogonality through a configuration such that:

a mathematical expectation of a batch is set to zero, gamma parameters for each layer of the neural network are selected to be identical so that a dispersion of vector components is identical, and a beta parameter is excluded from calculations to maintain a zero mathematical expectation.

12. The system of claim 9, wherein the orthogonality of the matrices of the neural network is further preserved by multiplying a dense layer by a hyper-parameter, wherein the hyper-parameter satisfies a norm of transformation matrix vectors and provides additional regularization to prevent overtraining and to maintain the orthogonality of the matrices of the neural network.

13. The system of claim 9, wherein the orthogonality of the matrices of the neural network is further preserved by using a hyperbolic tangent as an activation function, wherein the hyperbolic tangent preserves the orthogonality by performing a non-linear transformation of data and minimizing additional correlation introduced by activation.

14. The system of claim 9, wherein the orthogonality of the matrices of the neural network is further preserved by having a loss function implement a constant dispersion of neurons of the neural network, wherein the loss function includes a penalty term that enforces the constant dispersion of the neurons in the neural network by penalizing deviations from orthogonality in weight matrices.

15. A non-transitory computer readable medium storing thereon computer executable instructions for clustering email messages identified as spam using a trained classifier, including instructions for:

selecting at least two characteristics from each received email message;

for each received email message, using a classifier containing a neural network, determining whether or not the email message is a spam based on the at least two characteristics of the email message, wherein the classifier is trained such that orthogonality of matrices of the neural network is preserved using a dropout layer that reduces correlation between neurons and preserves the orthogonality by ensuring equally probable exclusion of a certain percentage of random neurons including both hidden and visible layers on different iterations during training;

for each email message determined as being a spam email, calculating a feature vector, the feature vector being calculated at a final hidden layer of the neural network without calculating a gradient during application of the classifier, wherein a width of the final hidden layer is restricted to reduce a dimensionality of the feature vector; and generating one or more clusters of the email messages identified as spam based on similarities of the feature vectors calculated at the final hidden layer of the neural network, wherein a cluster is generated when a cosine distance between two or more feature vectors is below a predetermined threshold value.

16. The non-transitory computer readable medium of claim 15, wherein a characteristic of the email message comprises at least one of: a value of a header of the email message, and a sequence of parts of the header of the email message.

17. The non-transitory computer readable medium of claim 15, wherein the orthogonality of the matrices of the neural network is further preserved using a modified batch-normalization layer, and wherein the modified batch-normalization layer preserves the orthogonality through a configuration such that:

a mathematical expectation of a batch is set to zero, gamma parameters for each layer of the neural network are selected to be identical so that a dispersion of vector components is identical, and a beta parameter is excluded from calculations to maintain a zero mathematical expectation.

18. The non-transitory computer readable medium of claim 15, wherein the orthogonality of the matrices of the neural network is further preserved by multiplying a dense layer by a hyper-parameter, wherein the hyper-parameter satisfies a norm of transformation matrix vectors and provides additional regularization to prevent overtraining and to maintain the orthogonality of the matrices of the neural network.

19. The non-transitory computer readable medium of claim 15, wherein the orthogonality of the matrices of the neural network is further preserved by using a hyperbolic tangent as an activation function, wherein the hyperbolic tangent preserves the orthogonality by performing a non-linear transformation of data and minimizing additional correlation introduced by activation.

20. The non-transitory computer readable medium of claim 15, wherein the orthogonality of the matrices of the neural network is further preserved by having a loss function implement a constant dispersion of neurons of the neural network, wherein the loss function includes a penalty term that enforces the constant dispersion of the neurons in the neural network by penalizing deviations from orthogonality in weight matrices.

* * * * *